United States Patent
Azuma

(10) Patent No.: US 12,077,465 B2
(45) Date of Patent: Sep. 3, 2024

(54) METHOD FOR MANUFACTURING DISK-SHAPED GLASS BLANK AND METHOD FOR MANUFACTURING GLASS SUBSTRATE FOR MAGNETIC DISK

(71) Applicant: HOYA CORPORATION, Tokyo (JP)

(72) Inventor: Shuhei Azuma, Hung Yen Province (VN)

(73) Assignee: HOYA CORPORATION, Tokyo (JP)

( * ) Notice: Subject to any disclaimer, the term of this patent is extended or adjusted under 35 U.S.C. 154(b) by 662 days.

(21) Appl. No.: 16/960,849

(22) PCT Filed: Jan. 28, 2019

(86) PCT No.: PCT/JP2019/002758
§ 371 (c)(1),
(2) Date: Jul. 8, 2020

(87) PCT Pub. No.: WO2019/151185
PCT Pub. Date: Aug. 8, 2019

(65) Prior Publication Data
US 2021/0061699 A1     Mar. 4, 2021

(30) Foreign Application Priority Data
Jan. 31, 2018    (JP) .................................. 2018-014590

(51) Int. Cl.
    *C03B 33/02*       (2006.01)
    *B23K 26/06*       (2014.01)
    (Continued)

(52) U.S. Cl.
    CPC ...... *C03B 33/0222* (2013.01); *B23K 26/0624* (2015.10); *B23K 26/361* (2015.10);
    (Continued)

(58) Field of Classification Search
None
See application file for complete search history.

(56) References Cited

U.S. PATENT DOCUMENTS

| | | | |
|---|---|---|---|
| 9,873,628 B1 * | 1/2018 | Haloui ................ | C03B 33/0222 |
| 2002/0108400 A1 * | 8/2002 | Watanabe .......... | G11B 5/73921 |
| | | | 428/64.2 |

(Continued)

FOREIGN PATENT DOCUMENTS

| | | |
|---|---|---|
| CN | 102959626 A | 3/2013 |
| JP | 2009087409 A | 4/2009 |

(Continued)

OTHER PUBLICATIONS

International Search Report in PCT/JP2019/002758 dated Apr. 23, 2019.

(Continued)

*Primary Examiner* — Jodi C Franklin
(74) *Attorney, Agent, or Firm* — Global IP Counselors, LLP

(57) ABSTRACT

A glass blank is cut out from a glass plate by forming a crack starting portion inside the glass plate by moving a first laser beam relative to the glass plate such that a focal position of the laser beam is located in an inner portion of the glass plate in its thickness direction and the focal position forms a circle when viewed from a surface of the glass plate, then causing cracks to develop from the crack starting portion toward main surfaces of the glass plate, and splitting the glass plate to separate, from the glass plate, a glass blank that includes a separation surface having an arithmetic average surface roughness Ra smaller than 0.01 μm and a roundness not larger than 15 μm. Thereafter, main surfaces of the glass blank are ground or polished.

7 Claims, 3 Drawing Sheets

(51) Int. Cl.
  *B23K 26/0622* (2014.01)
  *B23K 26/08* (2014.01)
  *B23K 26/361* (2014.01)
  *B23K 26/53* (2014.01)
  *C03B 33/04* (2006.01)
  *C03B 33/09* (2006.01)
  *C03B 33/10* (2006.01)
  *C03C 19/00* (2006.01)
  *B23K 103/00* (2006.01)

(52) U.S. Cl.
  CPC .............. *B23K 26/53* (2015.10); *C03B 33/04* (2013.01); *C03B 33/091* (2013.01); *C03B 33/102* (2013.01); *C03C 19/00* (2013.01); *B23K 2103/54* (2018.08)

(56) References Cited

U.S. PATENT DOCUMENTS

| | | | |
|---|---|---|---|
| 2004/0016729 A1* | 1/2004 | Cuvelier | C03B 33/0955 219/121.72 |
| 2006/0160331 A1 | 7/2006 | Fukuyo et al. | |
| 2009/0136659 A1* | 5/2009 | Marquez | G11B 5/8404 83/56 |
| 2013/0323469 A1* | 12/2013 | Abramov | B23K 26/364 428/155 |
| 2015/0038313 A1* | 2/2015 | Hosseini | B23K 26/0648 219/121.75 |
| 2015/0118522 A1* | 4/2015 | Hosseini | C03B 33/0222 428/64.2 |
| 2015/0165548 A1* | 6/2015 | Marjanovic | C03B 33/091 219/121.73 |
| 2015/0166394 A1* | 6/2015 | Marjanovic | B23K 26/0884 428/192 |
| 2015/0232369 A1 | 8/2015 | Marjanovic et al. | |
| 2016/0005431 A1 | 1/2016 | Tamaki et al. | |
| 2016/0059349 A1* | 3/2016 | Sercel | B23K 26/402 65/32.1 |
| 2016/0059354 A1* | 3/2016 | Sercel | B23K 26/0853 219/121.68 |
| 2016/0200621 A1* | 7/2016 | N'Gom | B23K 26/53 65/355 |
| 2016/0280580 A1* | 9/2016 | Bohme | B23K 26/38 |
| 2016/0282527 A1* | 9/2016 | Saito | G02B 5/1852 |
| 2016/0368809 A1* | 12/2016 | Hackert | B23K 26/359 |
| 2017/0120374 A1* | 5/2017 | Hendricks | B23K 26/0624 |
| 2018/0001425 A1* | 1/2018 | Sercel | B23K 26/0876 |
| 2018/0134604 A1* | 5/2018 | Ortner | B32B 17/00 |
| 2018/0134606 A1* | 5/2018 | Wagner | C03B 33/04 |
| 2018/0370840 A1* | 12/2018 | Plapper | B23K 26/0006 |
| 2019/0233321 A1* | 8/2019 | Ellison | B23K 26/009 |
| 2019/0283178 A1* | 9/2019 | Mishchik | B33Y 10/00 |
| 2019/0314934 A1* | 10/2019 | Sercel | B23K 26/38 |
| 2020/0130105 A1* | 4/2020 | Isobe | B23K 26/0006 |
| 2020/0161149 A1* | 5/2020 | Nakamura | H01L 21/6838 |
| 2021/0230042 A1* | 7/2021 | Azuma | C03C 23/0025 |
| 2021/0394327 A1* | 12/2021 | Huzinec | B24B 9/10 |
| 2022/0089479 A1* | 3/2022 | Azuma | B24B 37/08 |
| 2022/0227654 A1* | 7/2022 | Azuma | C03C 3/078 |
| 2022/0274211 A1* | 9/2022 | Saito | B23K 26/0624 |
| 2022/0274870 A1* | 9/2022 | Azuma | B23K 26/3576 |

FOREIGN PATENT DOCUMENTS

| | | |
|---|---|---|
| JP | 2009241154 A | 10/2009 |
| JP | 2012218103 A | 11/2012 |
| JP | 2015076115 A | 4/2015 |
| JP | 2015083320 A | 4/2015 |
| JP | 2015181085 A | 10/2015 |
| JP | 2017508691 A | 3/2017 |
| JP | 2017511777 A | 4/2017 |
| WO | 2015002152 A1 | 1/2015 |

OTHER PUBLICATIONS

Office Action translated into Japanese in the corresponding Chinese Patent Application No. 201980009730.9, dated Jun. 25, 2021.

* cited by examiner

METHOD FOR MANUFACTURING DISK-SHAPED GLASS BLANK AND METHOD FOR MANUFACTURING GLASS SUBSTRATE FOR MAGNETIC DISK

CROSS-REFERENCE TO RELATED APPLICATIONS

This U.S. National stage application of International Patent Application No. PCT/JP2019/002758, filed on Jan. 28, 2019, which, in turn, claims priority to Japanese Patent Application No. 2018-014590, filed in Japan on Jan. 31, 2018. The entire contents of Japanese Patent Application No. 2018-014590 are hereby incorporated herein by reference.

BACKGROUND

Field of the Invention

The present invention relates to a method for manufacturing a disk-shaped glass blank and a method for manufacturing a glass substrate for a magnetic disk that include processing for cutting out a glass blank from a glass plate using a laser beam.

Background Information

Nowadays, to record data, hard disk apparatuses are used in personal computers, notebook-sized personal computers, DVD (Digital Versatile Disc) recording apparatuses, data centers for cloud computing, and the like. A magnetic disk obtained by providing a magnetic layer on a glass substrate for a magnetic disk, which is a disk-shaped non-magnetic material, is used in a hard disk apparatus. The magnetic disk is incorporated into a DFH (Disk Flying Height) type magnetic head that has a flying height of about 5 nm, for example.

In such a DFH type magnetic head, the flying height is short, and accordingly attachment of minute particles etc., to main surfaces of the magnetic disk is to be avoided. In order to suppress attachment of minute particles, it is desirable to precisely polish not only main surfaces of a glass substrate but also edge surfaces of the glass substrate to reduce surface roughness. Also, it is desirable for a disk-shaped magnetic disk to have a high degree of roundness so that the magnetic disk can stably rotate at a high speed.

In order to satisfy these requirements for magnetic disks, edge surface polishing is performed to reduce the surface roughness of edge surfaces (an inner edge surface and an outer edge surface) of a glass substrate for a magnetic disk and improve the roundness.

A glass substrate for a magnetic disk is obtained by cutting a glass plate, chamfering edge surfaces, polishing edge surfaces, grinding and polishing main surfaces, and washing the glass plate.

A technology for cutting out a glass blank from a glass plate using a laser beam, instead of performing scribing using a cutter and splitting, in the above-described cutting of a glass plate, is proposed (JP 2017-511777A).

In the above-described technology, a plurality of defect lines (perforations) are formed by repeatedly causing the generation of a defect line (perforation) along a laser beam focal line of a pulsed laser beam within a glass plate by directing the laser beam focal line into the glass plate at a predetermined angle of incidence to the glass plate while moving the glass plate and the laser beam parallel to each other. At this time, cracks propagate between adjacent defect lines (perforations), and accordingly a glass blank having a desired shape can be cut out from the glass plate. The defect lines (perforations) are spaced apart from each other by a distance of 2 µm.

SUMMARY

Although a disk-shaped glass blank can be manufactured from a glass plate using the above-described technology, the glass blank is cut out based on the defect lines (perforations), and accordingly portions of cross-sectional shapes of holes constituting the defect lines remain in edge surfaces of the obtained glass blank. Therefore, edge surface polishing needs to be performed to obtain a glass substrate for a magnetic disk that has a small surface roughness not only on the main surfaces but also on the edge surfaces from the obtained glass blank. Edge surface polishing takes a long time and is not preferable in terms of not only manufacturing efficiency but also manufacturing cost. It is preferable to perform cutting using a laser beam in such a manner that, even if edge surface polishing is performed, polishing time can be reduced when compared to that required in conventional technologies, or the need for edge surface polishing can be eliminated.

Therefore, an object of the present invention is to provide a method for manufacturing a disk-shaped glass blank and a method for manufacturing a glass substrate for a magnetic disk including processing with which it is possible to significantly reduce edge surface polishing time compared to that required in conventional technologies, and preferably, it is possible to cut out a glass blank that has an edge surface having a surface roughness and a roundness that eliminate the need for edge surface polishing, when the glass blank, from which the glass substrate for a magnetic disk is to be obtained, is cut out from a glass plate using a laser beam.

If a disk-shaped glass blank is cut out based on a plurality of defect lines formed by perforating a glass plate as described above, an edge surface does not have a preferable shape that simultaneously satisfies requirements of the surface roughness and the roundness.

On the other hand, a glass blank can be cut out by emitting a laser beam such that a focal position of the laser beam is located on a main surface of a glass plate to form defects on the main surface, and causing cracks to develop from the defects into the glass plate, but in this case as well, an edge surface does not have a preferable shape that simultaneously satisfies requirements of the surface roughness and the roundness. The inventor of the present invention found that, in contrast, if a glass blank is cut out by forming defects inside a glass plate and causing cracks to develop from the defects toward both main surfaces of the glass plate, the surface roughness of an edge surface is small and the degree of roundness is high.

Also, the inventor of the present invention found that, even if a glass blank does not have a shape that simultaneously satisfies requirements of the surface roughness of an edge surface and the roundness, if a laser beam is emitted toward a cut surface, i.e., a separation surface, of the glass blank from the direction of a normal to the separation surface to melt glass in the vicinity of the separation surface and form a chamfered surface on the glass blank, the separation surface of the glass blank formed through emission of the laser beam toward the separation surface has a small surface roughness and a high degree of roundness. Based on these facts, the inventor of the present invention arrived at the following aspects of the present invention.

One aspect of the present invention is a method for manufacturing a disk-shaped glass blank. The method includes:

separation processing in which a crack starting portion is formed inside a glass plate by moving a first laser beam relative to the glass plate such that a focal position of the laser beam is located in an inner portion of the glass plate in a thickness direction thereof and the focal position forms a circle when viewed from a main surface of the glass plate, thereafter cracks are caused to develop from the crack starting portion toward main surfaces of the glass plate, and the glass plate is split to separate a glass blank from the glass plate, the glass blank including a separation surface that has an arithmetic average surface roughness Ra smaller than 0.01 µm and a roundness not larger than 15 µm; and grinding/polishing processing in which grinding or polishing is performed on main surfaces of the glass blank.

It is preferable that the focal position is located at a distance within a range of one third to two thirds of a thickness of the glass plate from a main surface of the glass plate.

It is also preferable that the focal position is located at a distance that is shorter than one third of a thickness of the glass plate from a main surface of the glass substrate.

It is preferable that the method further includes chamfering processing for chamfering a corner portion that is formed by a main surface of the glass blank and the separation surface using a second laser beam of a different type from the first laser beam, the chamfering processing being performed between the separation processing and the grinding/polishing processing.

It is preferable that the focal position is located at a portion removed through the chamfering processing.

It is preferable that the crack starting portion that has a circular shape is formed inside the glass plate by moving the first laser beam relative to the glass plate such that a trajectory of the focal position forms a circle when viewed from the main surface of the glass plate.

Another embodiment of the present invention is a method for manufacturing a disk-shaped glass blank. The method includes:

separation processing in which defects are intermittently formed on a circular separation boundary line that is defined on a main surface of a glass plate, by emitting a first laser beam while moving the first laser beam relative to the glass plate, a line-shaped defect is formed by connecting the formed defects, and a glass blank is separated from the glass plate;

chamfering processing in which a second laser beam of a different type from the first laser beam is emitted from a direction of a normal to a separation surface of the glass blank to form a chamfered surface on the separation surface and form a glass blank that has the separation surface having an arithmetic average surface roughness Ra smaller than 0.01 µm and a roundness not larger than 15 µm; and grinding/polishing processing in which at least one of grinding and polishing is performed on main surfaces of the glass blank.

It is preferable that in the chamfering processing, the chamfered surface is formed such that the arithmetic average surface roughness Ra and the roundness of the separation surface are improved, by irradiating an entire circumference of the separation surface from a direction of a normal to the separation surface with the second laser beam while the glass plate is rotated about a center position of the glass plate at a constant speed such that the second laser beam and the separation surface are moved relative to each other in a circumferential direction of the glass plate.

It is preferable that a thickness of the glass plate is not larger than 0.6 mm.

Also, it is preferable that a thickness of the glass blank after the grinding/polishing processing is smaller than 0.52 mm.

It is preferable that the second laser beam is a pulsed laser beam that has a pulse width not larger than $10^{-12}$ seconds.

It is preferable that the roundness is 0.1 to 15 µm.

Another aspect of the present invention is a method for manufacturing a glass substrate for a magnetic disk, which further comprises grinding/polishing processing in which at least one of grinding or polishing, or both is performed on the main surfaces of the glass blank obtained by the method for manufacturing a disk-shaped glass blank.

It is preferable that a thickness of the glass blank after the grinding/polishing processing is smaller than 0.52 mm.

It is preferable that in the grinding/polishing processing, the at least one of grinding or polishing, or both is performed on the main surfaces of the glass blank while maintaining the roundness of the glass blank obtained through the separation processing and a surface roughness of at least a portion of the separation surface.

According to the above-described method for manufacturing a disk-shaped glass blank and the above-described method for manufacturing a glass substrate for a magnetic disk, it is possible to significantly reduce edge surface polishing time compared to that required in a conventional technology, and preferably, it is possible to cut out a glass blank that has an edge surface having a surface roughness and a roundness that eliminate the need for edge surface polishing.

DETAILED DESCRIPTION OF THE EMBODIMENTS

Figure 1A:
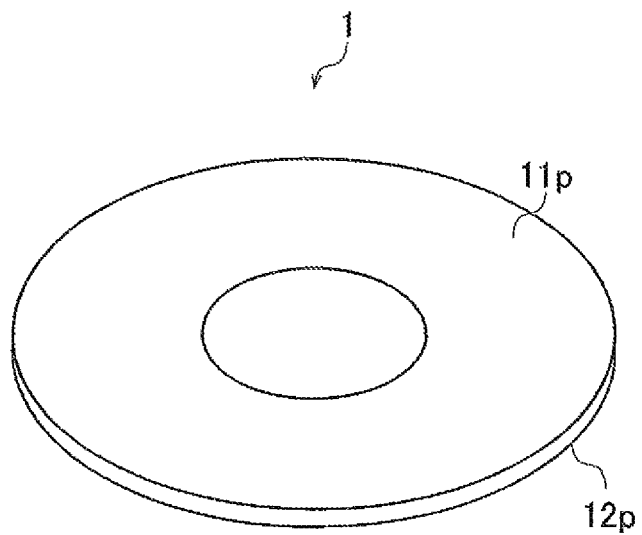
FIG. 1A is a perspective view of one example of a glass substrate for a magnetic disk manufactured in the present embodiment.

In a method for manufacturing a disk-shaped glass blank and a method for manufacturing a glass substrate for a magnetic disk according to the present embodiment, the glass substrate for a magnetic disk is manufactured by cutting out a disk-shaped glass blank from a glass plate along an inner circle and an outer circle that are concentric to each other, chamfering corner portions that connect edge surfaces (separation surfaces) and main surfaces of the obtained disk-shaped glass blank, and then grinding and polishing the main surfaces.

Here, in the case of a glass blank that is cut out from a glass plate using a laser beam in a conventional manner, an arithmetic average roughness Ra, which is a surface roughness, and roundness of edge surfaces (an inner edge surface and an outer edge surface), i.e., separation surfaces, of the glass blank do not fall within required ranges for edge surfaces of a glass substrate for a magnetic disk. Although the arithmetic average roughness Ra can be adjusted to fall within a required range by performing edge surface polishing on the glass blank cut out in a conventional manner, edge surface polishing takes a long time and manufacturing efficiency is reduced. On the other hand, it is difficult to improve the roundness of a glass blank with a low degree of roundness through adjustment.

Taking these points into consideration, in the present embodiment, a glass blank is cut out from a glass plate using a laser beam in a manner that differs from a conventional manner.

Specifically, in first processing according to one embodiment, a circular crack starting portion is formed inside a glass plate by moving a first laser beam relative to the glass plate such that a focal position of the first laser beam is located in an inner portion of the glass plate in its thickness direction and the focal position forms a circle when viewed from a main surface of the glass plate. Thereafter, cracks are caused to develop from positions at the circular crack starting portion toward main surfaces of the glass plate to split the glass plate, and thus a glass blank that includes separation surfaces (split surfaces) having an arithmetic average surface roughness Ra smaller than 0.01 μm and a roundness not larger than 15 μm is separated from the glass plate.

The crack starting portion is a portion in which the formation of blemishes, melting, degradation, or alteration occurs through irradiation with a laser beam, for example. As a result of the glass plate being heated, for example, cracks develop from the crack starting portion toward both main surfaces of the glass plate.

Thereafter, chamfering processing for forming chamfered surfaces using a second laser beam is performed before performing grinding/polishing processing, which will be described later. Accordingly, corner portions that are formed by the main surfaces and the separation surfaces of the glass blank are chamfered using the second laser beam of a different type from the first laser beam between separation processing for separating the glass blank from the glass plate and the grinding/polishing processing.

In second processing according to another embodiment, defects are intermittently formed on a circular separation boundary line that is defined on a main surface of a glass plate, by emitting a first laser beam while moving the first laser beam relative to the glass plate, and a line-shaped defect is formed by connecting the formed defects to separate a glass blank from the glass plate. A second laser beam is emitted from the direction of a normal to a separation surface of the separated glass blank to form a chamfered surface on the separation surface and form a glass blank that has the separation surface having an arithmetic average surface roughness Ra smaller than 0.01 μm and a roundness not larger than 15 μm.

Defects include blemishes, molten portions, degraded portions, and altered portions (hereinafter referred to as "blemishes etc.") that are formed in glass, holes (including through holes and bottomed holes) that are sharply recessed from the main surface of the glass plate and have small cross sections, cracks, etc. These defects serve as cores in the generation of cracks that are to develop.

Intermittently forming defects includes forming blemishes etc., or a plurality of holes (including through holes and bottomed holes) having small cross sections, which serve as cores in the generation of cracks, in the depth direction of the glass plate such that there are spaces between the blemishes etc., or the holes.

Forming a line-shaped defect includes forming a line-shaped crack that connects intermittently formed defects. Cracks include apparent cracks that form physical gaps in a glass material, as well as potential cracks that do not form physical gaps but form a boundary surface.

Separating a glass blank from a glass plate includes removing an outer portion that surrounds the glass blank such that a separated edge defines a circular outer circumference and removing an inner portion that is surrounded by the glass blank such that a circular inner hole is formed.

The roundness is measured by, for example, arranging a plate-shaped probe that is thicker than the glass blank such that the probe faces an edge surface of the glass blank in a direction perpendicular to the main surfaces of the glass substrate, acquiring an outline while rotating the glass blank in the circumferential direction, and calculating a difference between the radius of an inscribed circle and the radius of a circumscribed circle of the outline, as the roundness of the glass substrate. Note that the roundness can be measured using a roundness and cylindrical shape measuring apparatus, for example.

The arithmetic average roughness Ra is a value in accordance with JIS B0601:2001. In order to determine the arithmetic average roughness Ra, a surface shape of an edge surface of the glass blank is measured using a laser microscope in an evaluation region of 50 μm×50 μm under the following conditions.

Observation magnification: 3000× magnification
Measurement pitch in height direction (Z axis): 0.01 μm
Cut-off value λs: 0.25 μm
Cut-off value λc: 80 μm Note that resolution in the height direction is preferably not larger than 1 nm. Although the observation magnification is 3000× magnification in the present embodiment, the observation magnification is appropriately selected from within a range of about 1000× to about 3000× magnification depending on the size of the surface to be measured.

In the above-described first processing, an optical system of a laser beam source is adjusted such that the focal position of the first laser beam is located in an inner portion of the glass plate in its thickness direction, and accordingly light energy concentrates at the focal position and the focal position is locally heated to form the crack starting portion inside the glass. Thereafter, cracks are caused to develop from the crack starting portion toward the main surfaces by heating the glass plate, for example. A split surface that is formed through cracking has a small surface roughness. Also, the circle formed by the trajectory of the focal position can have a high degree of roundness by using a moving mechanism that can precisely move the first laser beam relative to the glass plate, for example. Although precision of the roundness of the glass blank accordingly depends on the straightness of cracks that extend from the focal position toward the main surfaces, cracks extend from the inner portion in the thickness direction of the glass plate, and therefore the distance by which cracks develop is short, when compared to a case in which cracks develop from one main surface toward the other main surface. Therefore, impairment of the roundness can be suppressed.

In the second processing, although the arithmetic average roughness Ra of the separation surface may be large and the degree of roundness may be low if a glass blank is separated by forming a crack connecting defects that are intermittently formed through irradiation with the first laser beam, a chamfered surface is formed by melting glass in the vicinity of the separation surface with heat by emitting the second laser beam from the direction of the normal to the separation surface, and therefore the surface roughness of the separation surface can be reduced and precision of the roundness can be improved through irradiation with the second laser beam at the same time that the chamfered surface is formed through irradiation with the second laser beam.

Thus, the arithmetic average surface roughness Ra of the separation surface can be set to be smaller than 0.01 μm and the roundness can be set to be not larger than 15 μm. According to one embodiment, the roundness can be set to 0.1 to 15 μm. The roundness is preferably not larger than 10 μm, more preferably not larger than 7 μm, and further preferably not larger than 5 μm.

Figure 1B:
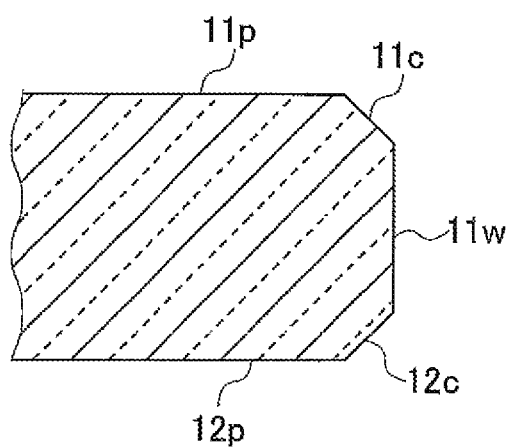
FIG. 1B is a diagram showing one example of a cross section of an outer edge surface of the glass substrate for a magnetic disk shown in FIG. 1A.

The following describes a method for manufacturing a glass substrate for a magnetic disk according to the present embodiment with reference to the drawings. FIG. 1A is a perspective view of one example of a glass substrate for a magnetic disk manufactured in the present embodiment. FIG. 1B is a diagram showing one example of a cross section of an outer edge surface of the glass substrate for a magnetic disk shown in FIG. 1A.

A glass substrate for a magnetic disk (hereinafter referred to as a "glass substrate") 1 shown in FIG. 1A is a glass substrate constituted by an annular thin plate. Although the size of the glass substrate for a magnetic disk is not limited, the glass substrate for a magnetic disk has the size of a glass substrate for a magnetic disk that has a nominal diameter of 2.5 inches or 3.5 inches, for example. In the case of a glass substrate for a magnetic disk having a nominal diameter of 2.5 inches, the outer diameter is 65 mm and the diameter of a center hole is 20 mm, for example. The thickness of the glass substrate 1 is not larger than 1.0 mm, and is 0.6 mm to 1.0 mm, for example. Alternatively, the thickness is smaller than 0.6 mm, e.g., smaller than 0.52 mm. A magnetic disk is obtained by forming magnetic layers on main surfaces of the glass substrate 1.

The glass substrate 1 includes a pair of main surfaces 11p and 12p, a side wall surface 11w that is formed on an outer edge surface, chamfered surfaces 11c and 12c that are respectively located between the side wall surface 11w and the main surfaces 11p and 12p, a side wall surface (not shown) that is formed on an inner edge surface similarly to the outer edge surface, and chamfered surfaces (not shown) that are respectively located between the side wall surface formed on the inner edge surface and the main surfaces 11p and 12p.

The glass substrate 1 includes a circular hole in a central portion. The side wall surface 11w includes a center position in the thickness direction of the glass substrate 1. The inclination angle of the chamfered surfaces 11c and 12c with respect to the main surfaces 11p and 12p is not specifically limited, and is 45°, for example. The shape of boundaries between the side wall surface 11w and the chamfered surfaces 11c and 12c is not limited to a shape that includes an edge as illustrated, and may also be a smooth continuously curved shape. The chamfered surfaces 11c and 12c may also be curved in a cross section, rather than being linearly inclined as shown in FIG. 1B.

First Processing

Figure 2A:
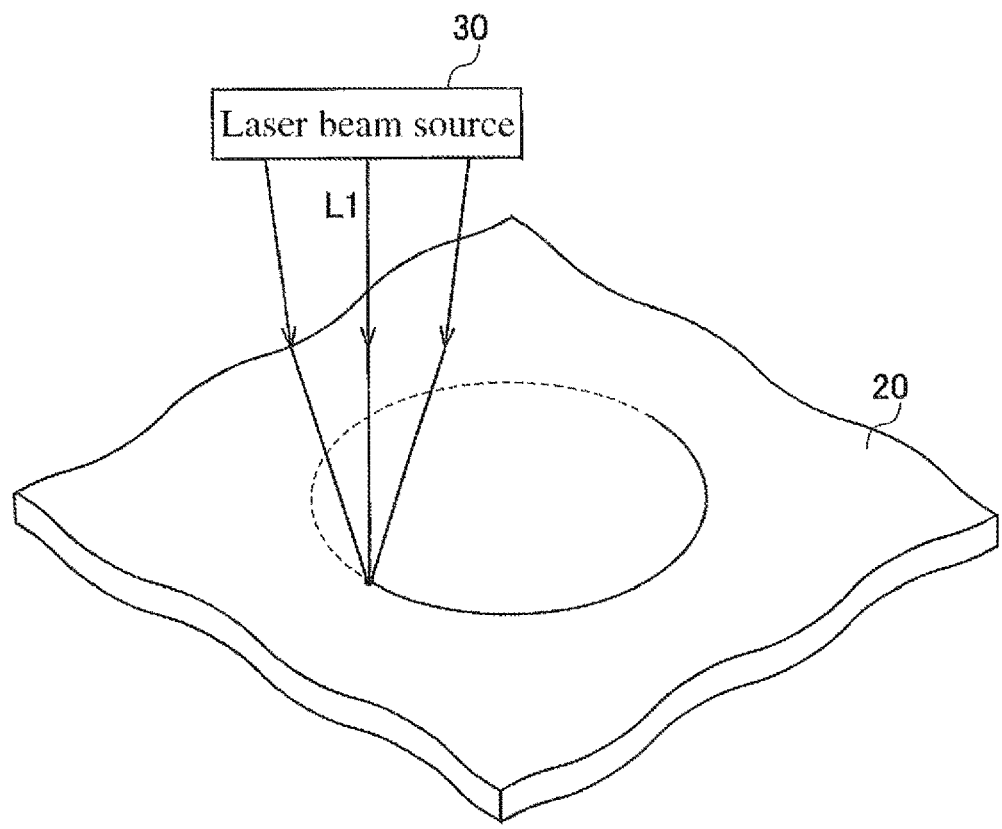
FIGS. 2A and 2B are diagrams showing one example of a method for cutting out a glass blank from a glass plate according to the present embodiment.
Figure 2B:
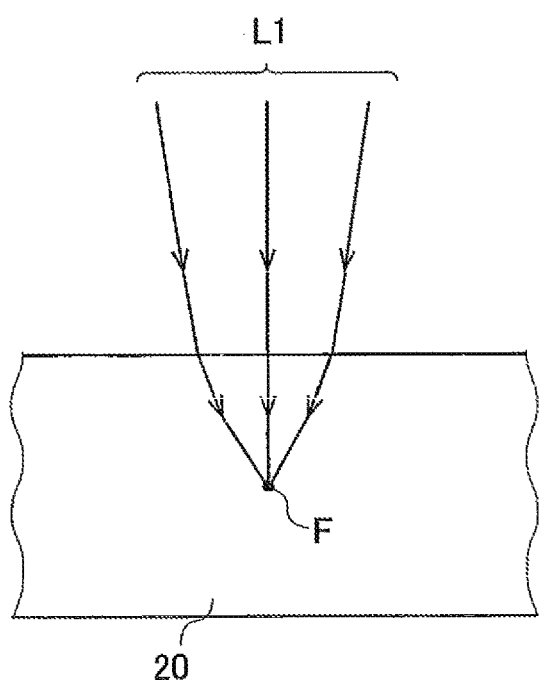
Figure 3:
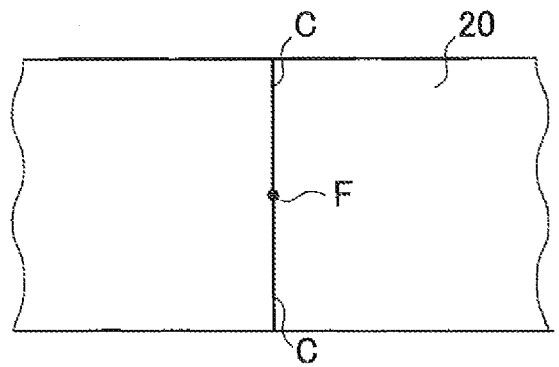
FIG. 3 is a diagram showing one example of the method for cutting out a glass blank from a glass plate according to the present embodiment.

In manufacture of such a glass substrate 1, separation processing for cutting out a glass blank from a glass plate, which is manufactured in advance, using a laser beam is performed. FIGS. 2A, 2B, and 3 are diagrams showing separation processing for cutting out a glass blank from a glass plate 20 according to one embodiment.

The glass plate 20 is a glass plate that is obtained using a floating method or a down draw method, for example, and has a constant thickness. Alternatively, the glass plate 20 may also be obtained through press molding using a mold. The thickness of the glass plate 20 is larger than a target thickness of a glass substrate for a magnetic disk, which is the end product, by an amount to be removed through grinding and polishing, which is about several micrometers, for example.

A laser beam source 30 is an apparatus that emits a laser beam L1 (first laser beam), and a solid-state laser, such as a YAG laser or an ND:YAG laser, is used, for example. Therefore, the wavelength of the laser beam is in a range of 1030 nm to 1070 nm, for example.

The laser beam L1 is a pulsed laser, and according to one embodiment, the pulse width of the laser beam L1 is preferably not larger than $10^{-12}$ seconds (not larger than 1 picosecond) in terms of suppressing excessive alteration of glass at a focal position F of the laser beam L1.

Light energy of the laser beam L1 can be appropriately adjusted according to the pulse width and the repetition frequency of the pulse width. If light energy that is excessively high relative to the pulse width and the repetition frequency is provided, the glass is likely to be excessively altered and a residue is likely to remain at the focal position F.

An optical system of the laser beam source 30 is adjusted such that the focal position F of the laser beam L1 is located in an inner portion of the glass plate 20 in its thickness direction as shown in FIG. 2B, and therefore light energy concentrates at the focal position F and the focal position F is locally heated, and a crack starting portion (core in the generation of cracks) is formed through the formation of blemishes, melting, degradation, or alteration. The focal position F is moved relative to the glass plate 20 to form a circle when viewed from a surface of the glass plate 20, and therefore the crack starting portion has a circular shape. By heating the glass plate 20, for example, cracks C are generated at respective positions in the crack starting portion inside the glass and caused to develop toward the main surfaces as shown in FIG. 3. As a result, a glass blank can be easily separated from the glass plate 20 without applying a strong force for splitting.

Thus, a glass blank that has a separation surface (split surface) having an arithmetic average surface roughness Ra smaller than 0.01 μm and a roundness not larger than 15 μm can be obtained. The roundness is preferably not larger than 10 μm, more preferably not larger than 7 μm, and further preferably not larger than 5 μm. This separation surface (split surface) is an edge surface that satisfies requirements for edge surfaces of a glass substrate for a magnetic disk. Therefore, the separation surface (split surface) need not be polished.

Note that, according to one embodiment, it is preferable that the focal position F is located at a distance in a range of one third to two thirds of the thickness of the glass plate 20 from a main surface of the glass plate 20. If the focal position F is set in this range, the separation surface (split surface) satisfying requirements of the roundness and the surface roughness can serve as the side wall surface 11w shown in FIG. 1B as is, and accordingly extra processing, such as edge surface polishing, need not be performed and manufacturing efficiency can be improved.

According to one embodiment, it is also preferable that the focal position F is located at a distance that is shorter than one third of the thickness of the glass plate from a main surface of the glass plate. In this case, the vicinity of the focal position F, in which a residue is likely to be formed and the surface roughness is impaired, when compared to a separation surface (split surface) formed through cracking, is removed through chamfering processing described later. Therefore, in order to further improve the surface roughness, it is preferable that the focal position F is located at a distance that is shorter than one third of the thickness of the glass plate from a main surface of the glass plate.

According to one embodiment, it is preferable that the laser beam L1 is a pulsed laser beam that has a pulse width not larger than $10^{-12}$ seconds. If the pulse width is larger than $10^{-12}$ seconds, the surface roughness is likely to be impaired as a result of light energy concentrating at the focal position F and the glass in the vicinity of the focal position F being altered.

Figure 4:
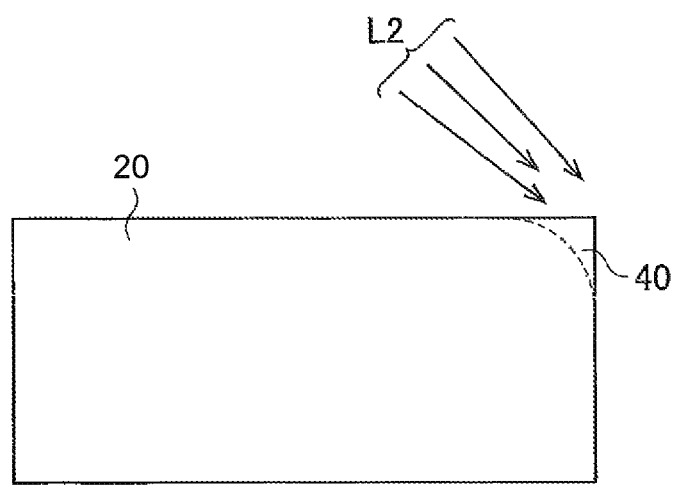
FIG. 4 is a diagram showing one example of chamfering processing performed in the present embodiment.

Chamfering processing is performed to chamfer corner portions that are formed by the main surfaces and the edge surfaces, which are the separation surfaces (split surfaces), of the glass blank separated from the glass plate 20 as described above. Specifically, the corner portions are chamfered using a laser beam L2 (second laser beam) of a different type from the laser beam L1. FIG. 4 is a diagram showing one example of the chamfering processing. The laser beam L2 is emitted from a direction that is inclined at an angle of 30° to 60° with respect to the main surface to heat a corner portion 40, and thus the corner portion 40 is softened, evaporated, and chamfered. A $CO_2$ laser can be preferably used, for example. In this case, it is preferable that the laser beam L2 is a pulsed laser, the repetition frequency of the laser beam L2 is not lower than 5 KHz, and the power density of the laser beam L2 per pulse in a unit area is not higher than 100 W/cm$^2$. A chamfered surface that has a small surface roughness and a high degree of roundness can be formed through the above-described chamfering.

Thus, a corner portion that is formed by a lower main surface and the side wall surface shown in FIG. 3 can also be chamfered using a similar laser beam L2. Since the corner portion 40 is chamfered using the laser beam L2, manufacturing efficiency is high, when compared to a case in which chamfering is performed using a grindstone etc.

As described above, edge surface polishing need not be performed in the processes from cutting out the glass blank to chamfering, and accordingly manufacturing efficiency is improved.

Second Processing

In second processing according to another embodiment, defects are intermittently formed on a circular separation boundary line defined on the glass plate 20, by emitting the laser beam L1 (first laser beam) while moving the laser beam L1 relative to the glass plate 20, and a line-shaped defect is formed by connecting the formed defects to separate a glass blank from the glass plate 20. The distance between adjacent defects that are intermittently formed is about several micrometers, e.g., 1 to 10 μm.

In this case, the focal position F of the laser beam L1 is not limited and need not necessarily have to be located in an inner portion of the glass plate 20 in its thickness direction as shown in FIG. 2B. The focal position F may be located on a main surface of the glass plate 20, for example. Through irradiation with the laser beam L1, light energy concentrates at an irradiated position, the irradiated position is locally heated, and a defect is formed as a crack starting portion (core in the generation of cracks) through the formation of blemishes, melting, degradation, or alteration. As a result of the glass plate 20 being heated, for example, cracks develop from respective positions of crack starting portions and connect to adjacent defects while forming a line. Thus, a line-shaped defect is formed on the separation boundary line, and a glass blank can be separated from the glass plate 20. In order that the glass blank can be easily separated from the glass plate 20, the glass plate 20 may be heated using a heater or a laser beam to form gaps between the glass blank and portions other than the glass blank due to a difference in thermal expansion.

As the laser beam L1 (first laser beam) used to intermittently form defects, a solid-state laser, such as a YAG laser or an ND:YAG laser, is used, for example. Therefore, the wavelength of the laser beam is in a range of 1030 nm to 1070 nm, for example.

The laser beam L1 is a pulsed laser, and according to one embodiment, the pulse width of the laser beam L1 is preferably not larger than $10^{-12}$ seconds (not larger than 1 picosecond) in terms of suppressing excessive alteration.

Light energy of the laser beam L1 can be appropriately adjusted according to the pulse width and the repetition frequency of the pulse width. If light energy that is excessively high relative to the pulse width and the repetition frequency is provided, the glass is likely to be excessively altered and a residue is likely to remain at the irradiated position.

Figure 5:
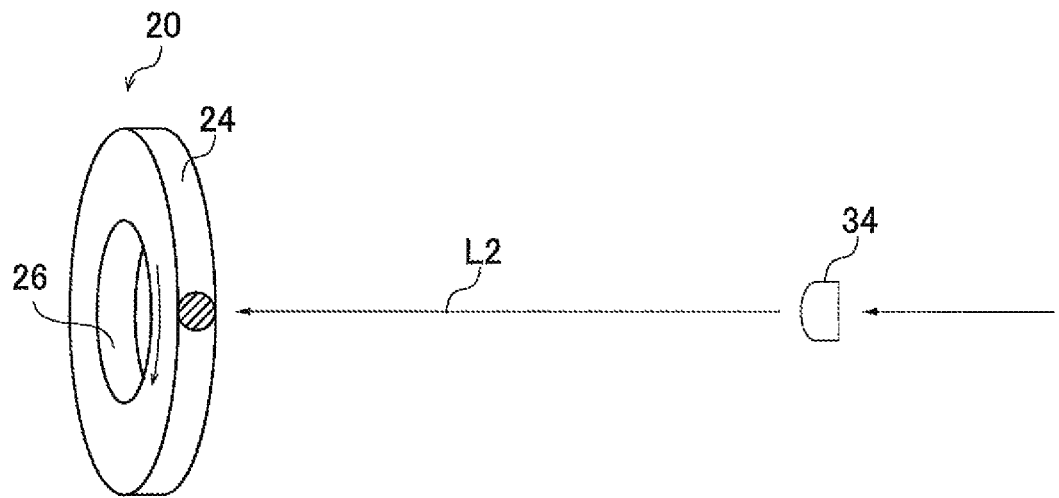
FIG. 5 is a diagram showing one example of chamfered surface forming processing performed in the present embodiment.

In the case of the second processing, a crack starting end is not necessarily located in an inner portion of the glass plate 20, and accordingly, in some cases, the surface roughness of a separation surface of the separated glass blank is not sufficiently small and the degree of roundness is not sufficiently high. However, when a chamfered surface is formed on the separation surface, the laser beam L2 is emitted toward the separation surface from the direction of a normal to the separation surface as shown in FIG. 5 to heat and melt a portion of glass in the vicinity of the separation surface through irradiation with the laser beam L2. Therefore, the surface roughness of the separation surface can be reduced and the roundness can be improved through irradiation with the second laser beam. FIG. 5 is a diagram showing one example of chamfered surface forming processing. By appropriately setting the intensity of the laser beam L2 and a spot diameter, the surface roughness of the separation surface can be reduced and the roundness can be improved while the chamfered surface is being formed. By adjusting the intensity of light energy of the second laser beam emitted toward the separation surface and the spot diameter at the separation surface, a chamfered surface having a desired shape and a preferable separation surface having a small surface roughness and a high degree of roundness can be formed.

The laser beam L2 is emitted from a laser beam source, formed into a parallel beam while being passed through an optical system that includes a collimator etc., then caused to converge using a converging lens 34, and then emitted toward the separation surface while spreading.

On the other hand, the glass plate 20 is rotated about the center position of the glass plate 20 at a constant speed. Thus, the entire circumference of the separation surface of the glass plate 20 is irradiated with the laser beam L2 while the laser beam L2 and the separation surface are moved relative to each other in the circumferential direction of the glass plate 20.

Here, the laser beam L2 is emitted toward the separation surface from the direction of a normal to the separation surface to be irradiated, and the direction of the normal includes, as allowable tolerances, directions that are inclined at an inclination angle of 0±10° with respect to the direction of the normal, in addition to the exact direction of the normal (inclination angle: 0°).

In the example shown in FIG. 5, the chamfered surface is formed on the separation surface, which is an outer circumferential edge surface 24 of the glass plate 20, but a chamfered surface may also be formed on a separation surface that is an inner circumferential edge surface 26 extending along the inner hole of the disk-shaped glass plate 20.

Although a $CO_2$ laser beam is used as one example of the laser beam L2, the laser beam L2 is not limited to the $CO_2$ laser beam and only required to have an oscillation wavelength that can be absorbed by glass. For example, a CO laser (oscillation wavelength: 5 μm), an Er-YAG laser (oscillation wavelength: 2.94 μm), etc., can be used.

Thus, a glass blank that has a separation surface having an arithmetic average surface roughness Ra smaller than 0.01 μm and a roundness not larger than 15 μm can be obtained. The roundness is preferably not larger than 10 μm, more preferably not larger than 7 μm, and further preferably not larger than 5 μm. This separation surface is an edge surface that satisfies requirements for edge surfaces of a glass substrate for a magnetic disk. Therefore, the edge surface need not be polished.

The above-described second processing is effective for an extremely thin glass plate that has a thickness not larger than 0.6 mm because, as the thickness of the glass plate is reduced, glass in the vicinity of the separation surface can be more easily melted in a short period of time by emitting the laser beam L2 toward the separation surface. In this case, the glass blank preferably has a thickness not larger than 0.52 mm after grinding/polishing processing described later.

By performing the above-described first and second processing, a disk-shaped glass blank that has a circular outer circumference and an inner hole that is concentric to the circular shape of the outer circumference can be obtained.

Main Surface Grinding/Polishing Processing

Grinding/polishing processing is performed on the main surfaces of a glass blank that is separated from a glass plate and provided with chamfered surfaces.

In the grinding/polishing processing, the glass blank is ground and then polished.

In grinding processing, grinding is performed on the main surfaces of the glass blank using a double-side grinding apparatus provided with a planetary gear mechanism. Specifically, both main surfaces of the glass blank are ground while the outer circumferential edge surface of the glass blank is held in a holding hole provided in a holding member of the double-side grinding apparatus. The double-side grinding apparatus has a pair of upper and lower surface plates (an upper surface plate and a lower surface plate), and the glass blank is sandwiched between the upper surface plate and the lower surface plate. The glass blank and the surface plates are moved relative to each other by moving one or both of the upper surface plate and the lower surface plate while supplying a coolant, and thereby both main surfaces of the glass blank can be ground. The grinding processing can be performed in a state in which grinding members obtained by forming fixed abrasive particles, which are obtained by fixing diamonds using resin, into a sheet-shape are attached to the surface plates, for example.

Next, first polishing is performed on the ground main surfaces of the glass blank. Specifically, both main surfaces of the glass blank are polished while the outer circumferential edge surface of the glass blank is held in a holding hole provided in a carrier for polishing of a double-side polishing apparatus. The first polishing is for removing blemishes and warping or adjusting minute surface unevenness (microwaviness, roughness) remaining on the main surfaces after the grinding processing.

In the first polishing processing, the glass blank is polished using a double-side polishing apparatus having a configuration similar to that of the double-side grinding apparatus used in the above-described grinding processing with fixed abrasive particles, while a polishing slurry is provided. In the first polishing processing, a polishing slurry containing loose abrasive particles is used. Cerium oxide abrasive particles, zirconia abrasive particles, etc., are used as the loose abrasive particles in the first polishing, for example. Similarly to the double-side grinding apparatus, the double-side polishing apparatus sandwiches the glass blank between a pair of upper and lower surface plates. Tabular polishing pads (resin polisher, for example) having an annular shape overall are attached to the upper surface of the lower surface plate and the bottom surface of the upper surface plate. The glass blank and the surface plates are moved relative to each other by moving one or both of the upper surface plate and the lower surface plate, and thereby both main surfaces of the glass blank are polished. It is preferable that polishing abrasive particles have an average particle diameter (D50) in a range of 0.5 to 3 μm.

After the first polishing, the glass blank may be chemically strengthened. In this case, a melt in which potassium nitrate and sodium sulfate are mixed, for example, is used as a chemical strengthening liquid, and the glass blank is immersed in the chemical strengthening liquid. Thus, a compressive stress layer can be formed on the surface of the glass blank through ion exchange.

Next, second polishing is performed on the glass blank. The second polishing processing is for mirror-polishing the main surfaces. In the second polishing as well, a double-side polishing apparatus having a configuration similar to that of the double-side polishing apparatus used in the first polishing is used. Specifically, both main surfaces of the glass blank are polished while the outer circumferential edge surface of the glass blank is held in a holding hole provided in a carrier for polishing of the double-side polishing apparatus. The second polishing processing differs from the first polishing processing in that the type and particle size of the loose abrasive particles are different, and the hardness of the resin polishers is different. The hardness of the resin polishers is preferably lower than that of the resin polishers used in the first polishing processing. For example, a polishing liquid containing colloidal silica as loose abrasive particles is supplied between the polishing pads of the double-side polishing apparatus and the main surfaces of the glass blank, as a result of which the main surfaces of the glass blank are polished. It is preferable that the polishing abrasive particles used in the second polishing have an average particle diameter (d50) in a range of 5 to 50 nm.

In one embodiment, whether not to perform chemical strengthening processing may be appropriately selected taking the glass composition or the necessity into account. Another type of polishing processing may be added to the first polishing processing and the second polishing processing, and two types of polishing processing performed on the main surfaces may be performed as single polishing processing. The order of the above-described processing may be appropriately changed.

As a result of the main surfaces of the glass blank 20 being polished as described above, a glass substrate for a magnetic disk that satisfies requirements for glass substrates for magnetic disks can be obtained.

Note that it is not always necessary to perform both grinding and polishing of the main surfaces of the glass blank 20, and it is only required to perform at least either grinding or polishing. For example, a configuration is also possible in which grinding is not performed and polishing is performed.

Note that edge surface polishing processing for polishing the edge surfaces (separation surfaces) of the glass blank 20 may also be performed before the first polishing, for example, after the grinding processing and before the first polishing, or before the first grinding.

Even if such edge surface polishing processing is performed, the edge surface polishing processing takes little time because the arithmetic average roughness Ra of the edge surfaces of the glass blank 20 is smaller than 0.01 μm and the roundness is not larger than 15 μm.

The edge surface polishing processing may be performed using a polishing brush method in which polishing is performed using a polishing brush while loose abrasive particles are supplied to the edge surfaces or a polishing method in which a magnetic functional fluid is used. In the polishing method in which a magnetic functional fluid is used, a slurry obtained by adding abrasive polishing particles to a magnetic viscous fluid is formed into a mass using a magnetic field, the edge surfaces of the glass blank 20 are thrusted into the mass, and the edge surfaces are polished by moving the mass and the glass blank 20 relative to each other.

However, it is preferable not to perform the edge surface polishing processing to increase manufacturing efficiency. In this case, the main surfaces of the glass blank are ground or polished in the grinding/polishing processing of the main surfaces while maintaining the roundness of the glass blank obtained through cutting processing and the surface roughness of at least a portion of the separation surfaces.

As a material of the glass substrate for a magnetic disk according to the present embodiment, aluminosilicate glass, soda-lime glass, borosilicate glass, etc., can be used. In particular, aluminosilicate glass can be preferably used from the standpoint that chemical strengthening can be performed and a glass substrate for a magnetic disk that has high strength and includes main surfaces having a high degree of flatness can be manufactured. Amorphous aluminosilicate glass is further preferable.

Although the composition of the glass substrate for a magnetic disk according to the present embodiment is not limited, the glass substrate according to the present embodiment is preferably amorphous aluminosilicate glass that has the following composition in which ratios of components are shown in terms of oxides using mol %: 50 to 75% of $SiO_2$, 1 to 15% of $Al_2O_3$, a total of 5 to 35% of at least one component selected from $Li_2O$, $Na_2O$, and $K_2O$, a total of 0 to 20% of at least one component selected from MgO, CaO, SrO, BaO, and ZnO, and a total of 0 to 10% of at least one component selected from $ZrO_2$, $TiO_2$, $La_2O_3$, $Y_2O_3$, $Ta_2O_5$, $Nb_2O_5$, and $HfO_2$.

Preferably, the glass substrate according to the present embodiment may be, for example, amorphous aluminosilicate glass that has the following composition in which ratios of components are shown using mass %: 57 to 75% of $SiO_2$, 5 to 20% of $Al_2O_3$ (under the provision that a total of $SiO_2$ and $Al_2O_3$ is 74% or more), a total of more than 0% and not more than 6% of $ZrO_2$, $HfO_2$, $Nb_2O_5$, $Ta_2O_5$, $La_2O_3$, $Y_2O_3$, and $TiO_2$, more than 1% and not more than 9% of $Li_2O$, 5 to 28% of $Na_2O$ (under the provision that a mass ratio $Li_2O/Na_2O$ is not larger than 0.5), 0 to 6% of $K_2O$, 0 to 4% of MgO, more than 0% and not more than 5% of CaO (under the provision that a total of MgO and CaO is not more than 5% and the amount of CaO is larger than the amount of MgO), and 0 to 3% of SrO+BaO.

The glass substrate for a magnetic disk according to the present embodiment may have a composition that includes, as essential components, $SiO_2$, $Li_2O$, $Na_2O$, and at least one alkaline earth metal oxide selected from the group consisting of MgO, CaO, SrO, and BaO, and in which the mole ratio (CaO/(MgO+CaO+SrO+BaO)) of the amount of CaO to a total amount of MgO, CaO, SrO, and BaO is not larger than 0.20, and the glass transition temperature of the glass substrate may be at least 650° C. A glass substrate for a magnetic disk having such a composition is preferable as a glass substrate for a magnetic disk that is used for a magnetic disk for energy assisted magnetic recording.

Although the method for manufacturing a disk-shaped glass blank and the method for manufacturing a glass substrate for a magnetic disk according to the present invention have been described in detail, the method for manufacturing a disk-shaped glass blank and the method for manufacturing a glass substrate for a magnetic disk according to the present invention are not limited to the above-described embodiments, and it goes without saying that various modifications and changes can be made within a scope not departing from the gist of the present invention.

The invention claimed is:

1. A method for manufacturing a disk-shaped glass blank, the method comprising:
   separating a removal target portion from a glass plate to form a glass blank, the separating being performed by forming a plurality of defects, which serve as core cracks, on a circular separation boundary line that is defined on a main surface of the glass plate such that a space is formed between adjacent defects of the plurality of defects, the forming of the plurality of defects being performed by emitting a first laser beam along the circular separation boundary line while moving the first laser beam relative to the glass plate, the first laser beam being a pulsed laser beam that has a pulse width not larger than $10^{-12}$ seconds, and
   forming a line-shaped defect by forming a crack connecting the plurality of defects; and
   irradiating a separation surface of the glass blank with a second laser beam of a different type from the first laser beam from a direction of a normal to the separation surface, such that glass in a vicinity of the separation surface is heated and melted through the irradiating with the second laser beam, to form a chamfered surface on the separation surface, and to form the glass blank that has a roundness not larger than 15 μm and that has the separation surface having an arithmetic average surface roughness Ra smaller than 0.01 μm, the separation surface being a circumferential edge surface of the glass blank separated from the removal target portion, and the roundness indicating a difference between a radius of an inscribed circle and a radius of a circumscribed circle for a circumferential outline of the separation surface.

2. The method for manufacturing a disk-shaped glass blank according to claim 1,
   wherein in the irradiating of the separation surface, the chamfered surface is formed such that the arithmetic average surface roughness Ra and the roundness of the glass blank are reduced, by irradiating an entire circumference of the separation surface from the direction of the normal to the separation surface with the second laser beam while the glass blank is rotated about a center position of the glass blank at a constant speed such that the second laser beam and the separation surface are moved relative to each other in a circumferential direction of the glass blank.

3. The method for manufacturing a disk-shaped glass blank according to claim 1,
wherein a thickness of the glass plate is not larger than 0.6 mm.

4. The method for manufacturing a disk-shaped glass blank according to claim 1,
wherein the roundness is 0.1 to 15 μm.

5. A method for manufacturing a glass substrate for a magnetic disk, the method comprising:
grinding/polishing processing in which at least one of grinding or polishing, or both is performed on the main surfaces of the glass blank obtained by the method for manufacturing a disk-shaped glass blank according to claim 1.

6. The method for manufacturing a glass substrate for a magnetic disk according to claim 5,
wherein a thickness of the glass blank after the grinding/polishing processing is smaller than 0.52 mm.

7. The method for manufacturing a glass substrate for a magnetic disk according to claim 5,
wherein, in the grinding/polishing processing, the at least one of grinding or polishing, or both is performed on the main surfaces of the glass blank while maintaining the roundness of the glass blank and the arithmetic average surface roughness of at least a portion of the separation surface.

* * * * *